United States Patent
Gacanin

(10) Patent No.: US 9,473,376 B2
(45) Date of Patent: Oct. 18, 2016

(54) METHOD AND SERVER FOR DETERMINING HOME NETWORK QUALITY

(71) Applicant: Alcatel Lucent, Boulogne-Billancourt (FR)

(72) Inventor: Haris Gacanin, Antwerpen (BE)

(73) Assignee: Alcatel Lucent, Boulogne-Billancourt (FR)

( * ) Notice: Subject to any disclaimer, the term of this patent is extended or adjusted under 35 U.S.C. 154(b) by 123 days.

(21) Appl. No.: 14/378,206

(22) PCT Filed: Mar. 11, 2013

(86) PCT No.: PCT/EP2013/054848
§ 371 (c)(1),
(2) Date: Aug. 12, 2014

(87) PCT Pub. No.: WO2013/135616
PCT Pub. Date: Sep. 19, 2013

(65) Prior Publication Data
US 2015/0036523 A1 Feb. 5, 2015

(30) Foreign Application Priority Data

Mar. 15, 2012 (EP) .................................. 123053027

(51) Int. Cl.
| H04L 12/26 | (2006.01) |
| H04L 12/28 | (2006.01) |
| H04L 29/06 | (2006.01) |
| H04L 12/24 | (2006.01) |

(52) U.S. Cl.
CPC ....... *H04L 43/0882* (2013.01); *H04L 12/2825* (2013.01); *H04L 43/08* (2013.01); *H04L 65/80* (2013.01); *H04L 41/0213* (2013.01)

(58) Field of Classification Search
CPC ... H04L 12/2825; H04L 43/08; H04L 65/80; H04L 43/0882; H04L 12/26
See application file for complete search history.

(56) References Cited

U.S. PATENT DOCUMENTS

| 2005/0091050 A1* | 4/2005 | Surendran ............... G10L 25/78 704/226 |
| 2010/0103941 A1* | 4/2010 | Jiang .................. H04L 12/2825 370/400 |
| 2010/0220622 A1* | 9/2010 | Wei ..................... H04L 41/0896 370/252 |

FOREIGN PATENT DOCUMENTS

| JP | 2008312145 A | 12/2008 |
| JP | 2014504116 A | 2/2014 |
| WO | WO-0215481 A2 | 2/2002 |
| WO | WO-2007146048 A2 | 12/2007 |
| WO | WO-2012104150 A1 | 8/2012 |

OTHER PUBLICATIONS

International Search Report PCT/ISA/210 for International Application No. PCT/EP2013/054848 Dated Jun. 3, 2013.

* cited by examiner

*Primary Examiner* — Anez Ebrahim
(74) *Attorney, Agent, or Firm* — Harness, Dickey & Pierce, P.L.C.

(57) ABSTRACT

Method for determining from a remote server a user quality of service (QoS) class of a home network, comprising the following steps performed at the remote server which is connected through the internet with the home network: obtaining home network measurement data of at least one home network parameter associated with a capacity of the home network, using an application layer protocol for remote management, said capacity being a measure for an amount of traffic that the home network can handle at one time; processing said home network measurement data to estimate the capacity of the home network or a parameter related thereto; based on the estimated capacity or parameter related thereto classifying said home network in a user QoS class.

13 Claims, 4 Drawing Sheets

METHOD AND SERVER FOR DETERMINING HOME NETWORK QUALITY

TECHNICAL FIELD

The invention relates to the field of home network quality of service classification. More in particular, the invention relates to a method, a server and a system for determining a user quality of service (QoS) class of a home network.

BACKGROUND

The availability of an increasing number of new services and technologies such as digital television, online gaming and home automation, requiring Internet access, leads to an increased number of home devices such as set up boxes, game consoles, a home automation system, plural desktops or laptops, etc. Those home devices are usually interconnected by means of a complex home network architecture which may comprise different mediums such as copper twisted-pair, coax, power line cables, etc.

When a user has network capacity problems, and the service operator believes that the problems may be due to the home network, the service operator may dispatch technicians to examine the home network. The technician may then determine that the user quality of service (QoS) of the home network is too low for the desired capacity. Such a dispatch of technicians is time consuming and expensive. Moreover it would be desirable for a user to be aware of the insufficient quality of his home network before buying a particular service.

SUMMARY

The object of embodiments of the present invention is to provide a more pro-active home network QoS classification. According to an embodiment of the invention, there is provided a method for determining from a remote server a user QoS class of a home network. The following steps are performed at the remote server connected to the home network through the internet. Home network measurement data of at least one home network parameter associated with a capacity of the home network is obtained using an application layer protocol for remote management through the internet. The capacity is a measure for the amount of traffic that the home network can handle at one time. The obtained home network measurement data is processed to estimate the capacity of the home network or a parameter related thereto. Based on the estimated capacity or parameter related thereto, the home network is classified in a user QoS class.

Such a method allows determining remotely which services the home network can handle. The method can further be used for troubleshooting and can provide information to the service operator about the home network QoS capabilities. Further, such a method has the advantage that it does not involve technicians going to the homes of the users and that it can be performed remotely.

According to a preferred embodiment, the application layer protocol for remote management is the TR-069 protocol. TR-181 discloses a device data model for TR-069, see http://www.broadband-forum.org/technical/download/TR-181_Issue-2.pdf. This document is included herein by reference. See also the data model definition which can be found on http://www.broadband-forum.org/cwmp/tr-181-2-4-0.html and which discloses in the section "device.upa.diagnostics" that it can be indicated to carry out port management tests in order to obtain network measurement data of network parameters such as the channel frequency response (CFR) and the signal-to-noise ratio (SNR). This disclosure is also incorporated by reference.

According to a preferred embodiment, the home network is connected to the internet through a home gateway, and the network measurements are obtained through the home gateway. The home gateway can be a TR-069 enabled device adapted to request a home network communication device to perform the measurements of the at least one home network parameter. Note however that the remote server may also communicate directly with a communication device of the home network, e.g. a power line adapter, instead of with the home gateway.

Typically a home network parameter is a parameter of the physical layer.

According to a preferred embodiment, the at least one home network parameter comprises at least one of the following, preferably in the form of a frequency dependent vector: channel frequency response (CFR), signal-to-noise ratio (SNR), bit error rate (BER), cyclic redundancy check (CRC), retransmission counter, a noise level. Depending on the type of information needed by the service operator, one or more of said home network parameters may be measured on request of the remote server.

According to a preferred embodiment, the obtaining of home network measurement data comprises obtaining a plurality of measured CFR vectors. Each vector comprises values for a series of different frequencies. The processing of the home network measurement data then preferably comprises calculating at least one capacity vectors as a function of said plurality of CFR vectors, and calculating an average value based on said at least one capacity vector. The classifying is preferable based on the average capacity value.

According to a further developed embodiment, the obtained home network measurement data comprises measurement data representative for the noise in the home network. The classifying and/or processing is preferable also based on the measurement data representative for the noise.

According to a preferred embodiment, QoS classifying data comprising a plurality of user QoS classes with associated criteria are stored in a database; and the classifying of the home network is done by comparing the estimated capacity or a parameter related thereto with the QoS classifying data stored in the database, in order to determine the user QoS class of the home network that was measured.

According to another embodiment of the invention, there is provided a server adapted for determining a user QoS of a home network. The server is meant to function as a remote server which is connected to a plurality of home networks through the internet. The server comprises a data collector, a processor and a classifier. The data collector is adapted for obtaining home network measurement data of at least one home network parameter associated with a capacity of the home network, using an application layer protocol for remote management. The processor is adapted to process the home network management data to estimate the capacity of the home network or a parameter related thereto. The classifier is adapted to classify the home network in a user QoS class based on the estimated capacity or a parameter related thereto.

The data collector is preferably a TR-069 enabled device. Such a device will allow collecting measurement data of the home networks through the internet by sending a suitable TR-069 request message. Preferably, the data collector is adapted to collect at least one of the following, preferably in the form of a frequency dependent vector: channel frequency response (CFR), signal-to-noise ration (SNR), bit error rate (BER), cyclic redundancy check (CRC), retransmission counter, a noise level.

According to a preferred embodiment, the data collector is adapted to obtain a plurality of CFR vectors measured for the home network. The processor is then preferably adapted to calculate at least one capacity vector as a function of said plurality of CFR vectors, and to calculate an average capacity value based on said at least one capacity vector. The classifier is preferably adapted to classify the home network in a user QoS class based on at least the average capacity value.

According to a preferred embodiment, the data collector is adapted to obtain measurement data representative for noise in the home network. The classifier is preferably adapted to classify the home network based on the measurement data representative for the noise. More preferably, the classifier is adapted to classify the home network based on both measurement data representative for the CFR, and measurement data representative for the noise.

According to another aspect of the invention, there is provided a system comprising an embodiment of a server as disclosed above, as well as a home gateway. The server is connected through the Internet to the home gateway, and the home gateway is a TR-069 enabled device adapted to receive from the server a request for the network measurement data of at least one home network parameter associated with the capacity of the home network, to obtain measurement data of said at least one home network parameter, and to send the network measurement data to the server.

The system may further comprise a database storing classifying information for classifying the home network using the estimated capacity. Such classifying information may comprise criteria and rules for determining a user QoS class based on the estimated capacity. The classifier may be further adapted to translate the determined user QoS class into a service recommendation towards the service operator.

BRIEF DESCRIPTION OF THE FIGURES

The accompanying drawings are used to illustrate presently preferred non limiting exemplary embodiments of methods, servers and systems of the present invention. The above and other advantages of the features and objects of the invention will become more apparent and the invention will be better understood from the following detailed description when read in conjunction with the accompanying drawings, in which.

DETAILED DESCRIPTION

As explained in the background section above, home devices are usually interconnected by means of a complex home network architecture based on different mediums, such as copper twisted-pair, coax, power line cables, etc. In general, due to different sizes and branching of these network architectures, their corresponding transfer functions, i.e. channel signatures, become a limiting factor for the achievable network capacity. The Applicants have observed that this limiting factor will influence the user QoS over the corresponding home network.

Figure 1:
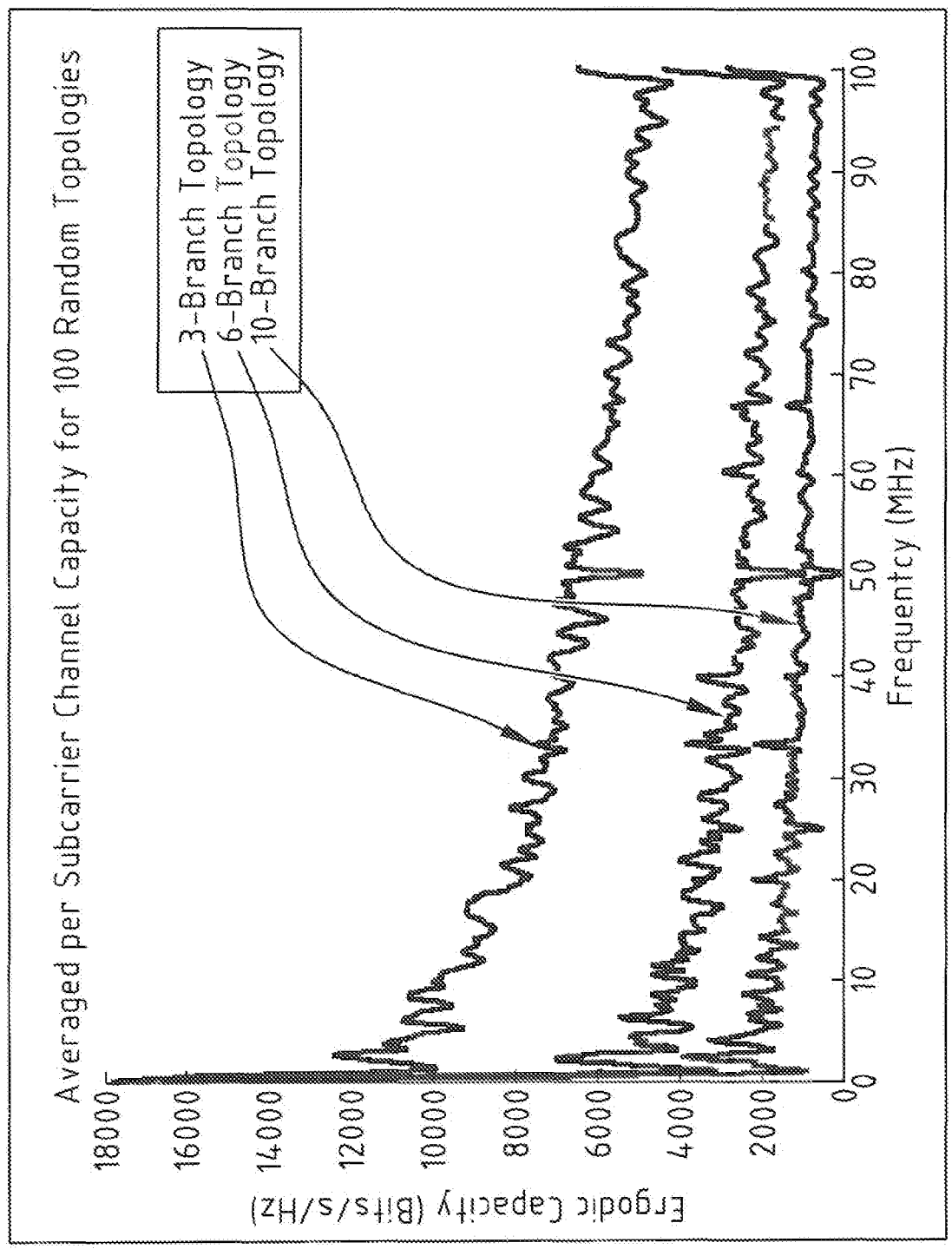
FIG. 1 is a graph of the ergodic capacity in bits/s in function of the frequency for three different home network topologies.

Embodiments of the present invention are based on the insight that it is possible to classify different home network types in user QoS classes. This is illustrated in FIG. 1. As an example, a frequency band of 100 MHz was used and was divided into 1.024 subcarriers, as one of the cases in the ITU G.hn standard. FIG. 1 illustrates three types of home network topologies with a different number of branches. In the example, a first topology with three branches, a second topology with six branches and a third topology with then branches was used. For each type of topology the number of randomly generated start topologies was 100, using a power line channel generator based on transmission line theory. The terminated impedances for the nodes were set to 50 ohms, while the branches were not terminated, i.e. were open circuits. The results in FIG. 1 illustrate that the QoS for each of these three network types can be distinguished through the capacity, i.e. through a corresponding channel measurement.

In practice this means that different types of home networks, e.g. residential buildings, houses, office buildings, etc. can have different capacities due to their different size and branching complexity. Embodiments of the invention have further been developed bearing in mind that it is desirable for a service operator to determine, before offering a particular service to a user, the available QoS of the user home network. Indeed, some home networks will not be able to support all types of services, and it is desirable to inform the user beforehand if a particular service cannot be supported.

Figure 2:
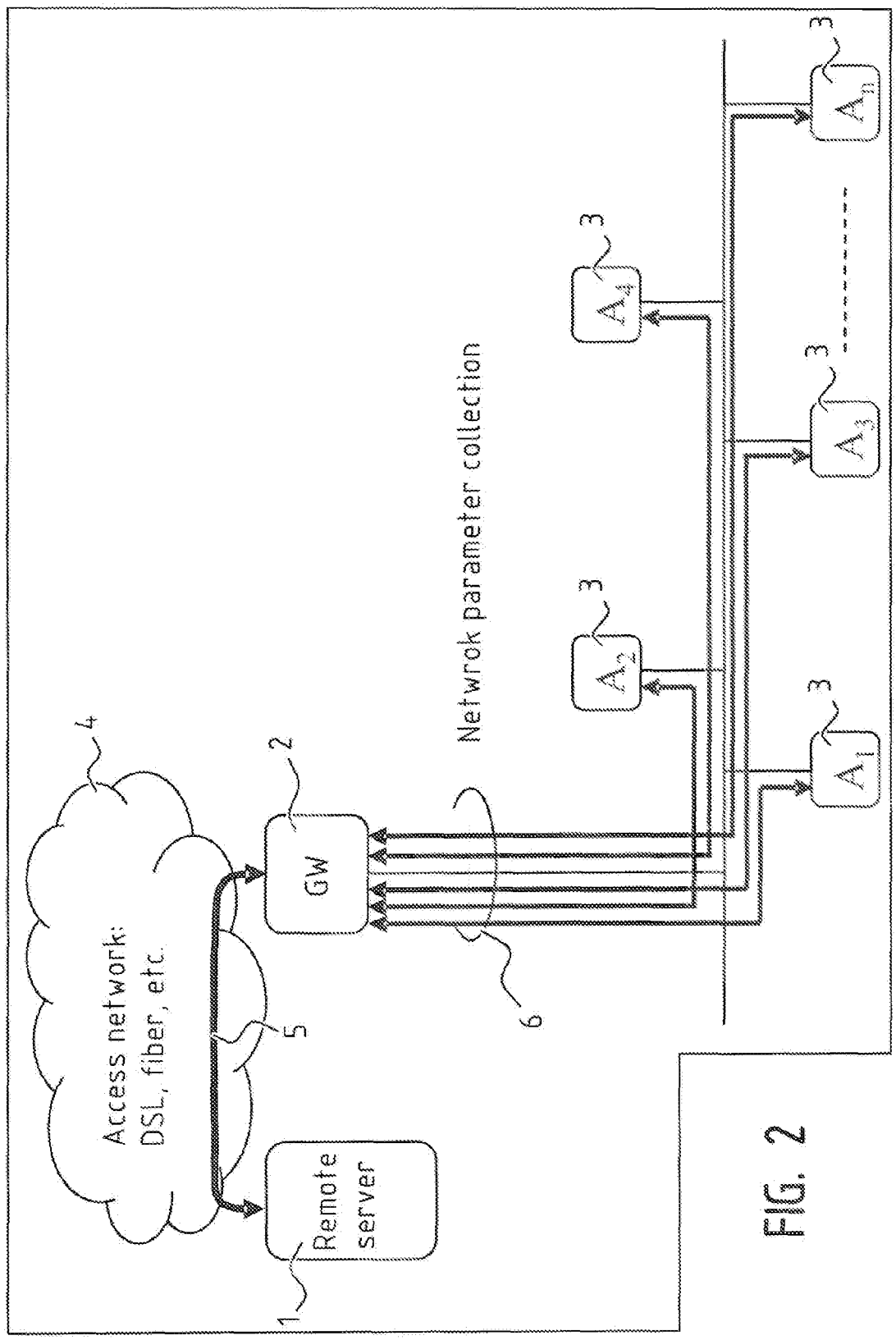
FIGS. 2 and 3 illustrate schematically an embodiment of the method of the invention.

Now an embodiment of the invention will be explained referring to FIGS. 2 and 3. A network architecture for use in an embodiment of the invention is illustrated in FIG. 2. The network architecture comprises a remote server 1 which is connected through the internet 4 and through a home gateway 2 with a series of home networks 3. The remote server 1 requests the home gateway 2, using an application layer protocol for remote management such as TR-069, to send home network measurement data of at least one home network parameter. This home network measurement data is collected by the home gateway 2 and sent to the remote server 1 using again the application layer protocol for remote management, see arrows 5 and 6 in FIG. 2. Although FIG. 2 illustrates to collect the home network measurement data through the home gateway 2, the skilled person understands that it is also possible to directly obtain the home network measurement data from a device in the home network 3.

Figure 3:
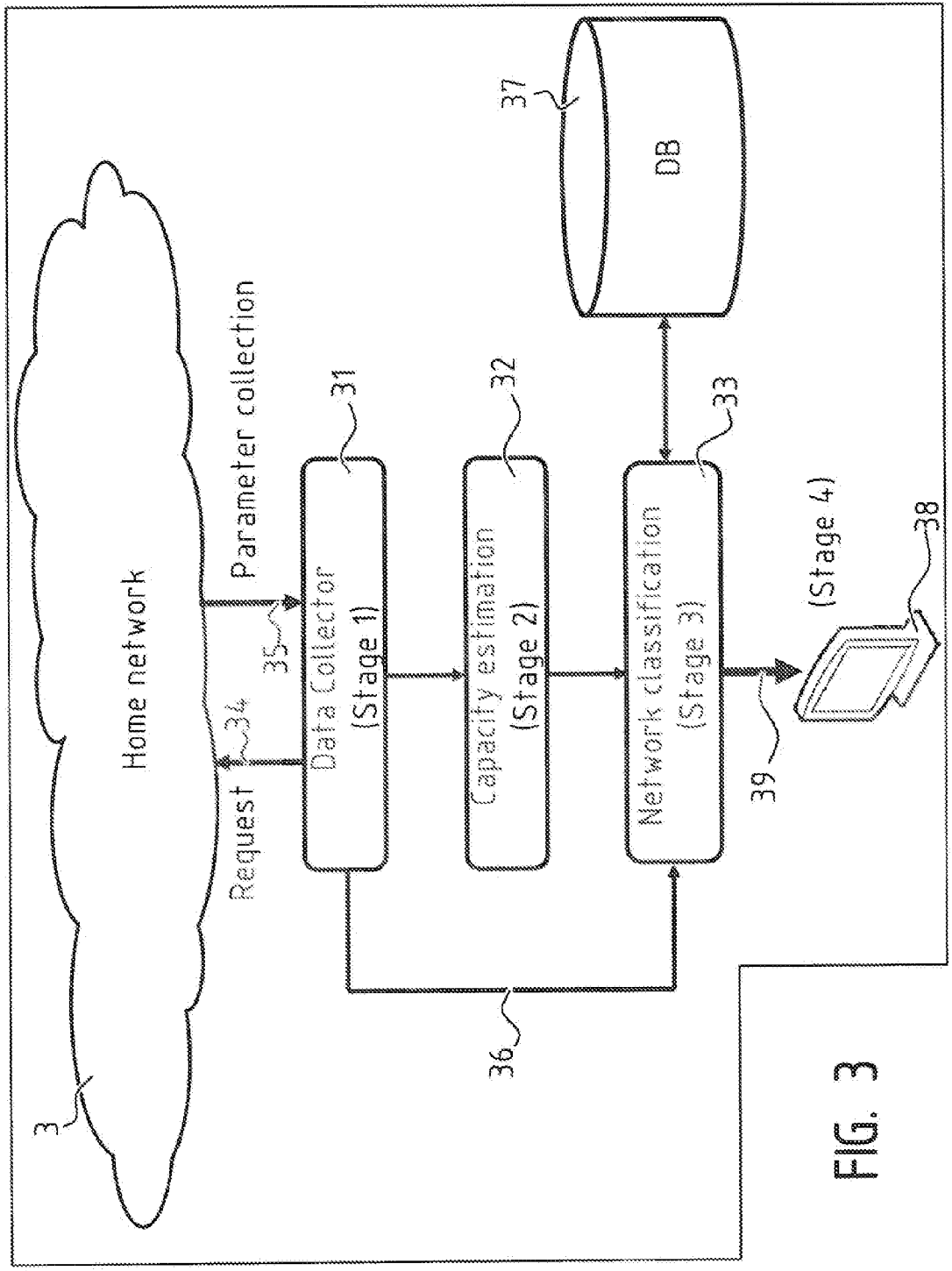

The next steps which are performed at the remote server 1, are illustrated in detail in FIG. 3. After having obtained the home network measurement data, see arrows 34 and 35 and step 31, the obtained home network measurement data is processed to estimate the capacity of the home network in step 32. The collected home network measurement data preferably takes the form of a frequency-dependent vector X, such as a CFR vector, a SNR vector, a BER vector, a CRC vector, a retransmission counter vector, etc. In the example below we will consider the CFR vector, but the skilled person will understand that the method of the invention is also applicable using another vector which is associated with the capacity of the home network.

In step 32, first the estimation metric is selected. This is a metric which is representative for the capacity of the home network or for a parameter related to the capacity of the home network. In this example, the home network capacity is used as the estimation metric, since it is the most intuitive and is directly related to the QoS requirements. However, the skilled person understands that other estimation metrics related to the capacity may also be used. In step 32, the following steps may be taken:

calculate the home network capacity based on the measured CFR vectors, without considering the noise effect:

$$C = f(X_1, \ldots, X_j, \ldots, X_m)$$

Note that each CFR vector $X_j$ may contain a plurality of CFR measurements: $X_j = (X_1, \ldots, X_n)_j$, wherein $1 \leq j \leq m$. m represents the number of measurements, and n represents the number of different frequencies for which the measurements are performed.

Based on the estimated capacity vector C, there may be derived a minimum capacity value $C_{min}$, a maximum capacity value $C_{max}$ and an average capacity value $C_{ave}$ for the corresponding network capacity vector C.

In a next step 33, the network is classified using the determined $C_{min}$, $C_{max}$ and $C_{ave}$ values. Further, optionally, the noise signature may be taken into account. According to an example, the classifying may be done as follows:

A similarity value is determined based on $C_{min}$ and $C_{max}$;

The estimated average capacity value $C_{ave}$ is compared with a reference capacity value of a reference QoS class set by the service operator in a database 37.

Based on the similarity value and the capacity value $C_{ave}$, the home network is classified in a predefined QoS class. In that way "similar" home networks may be grouped in cluster classes.

When receiving a service request it can then be determined if the cluster class in which the home network is classified can support the request. The noise estimates can also be used to check how much its deteriorating effects will be affecting the estimated capacity of the network.

In the example above a single average capacity valve $C_{ave}$, a minimum capacity value $C_{min}$, and a maximum capacity value $C_{max}$ were considered. However, it is also possible to consider average, maximum and minimum values for a series of different frequencies or for predefined frequency bands.

In the last step 39, a home network QoS class or service recommendation for the particular home network is given to a service operator 38. This QoS class or service recommendation helps service operators with the assessment of new customer home networks or with the maintenance of existing customer home networks. In that regard it is noted that the method illustrated in FIG. 3 may be performed at different moments in time and that the determined user QoS class may be stored for future reference. It is then possible to detect changes in the user QoS and act appropriately. A potential alarm can then be triggered at the service operator's side before the customer complains.

According to embodiments of the method of the invention measurement data may continuously be collected from a plurality of home networks in order to closely follow any changes in the user QoS of the home networks. According to another possibility, measurement data is only collected and/or processed on request of a service operator.

Figure 4:
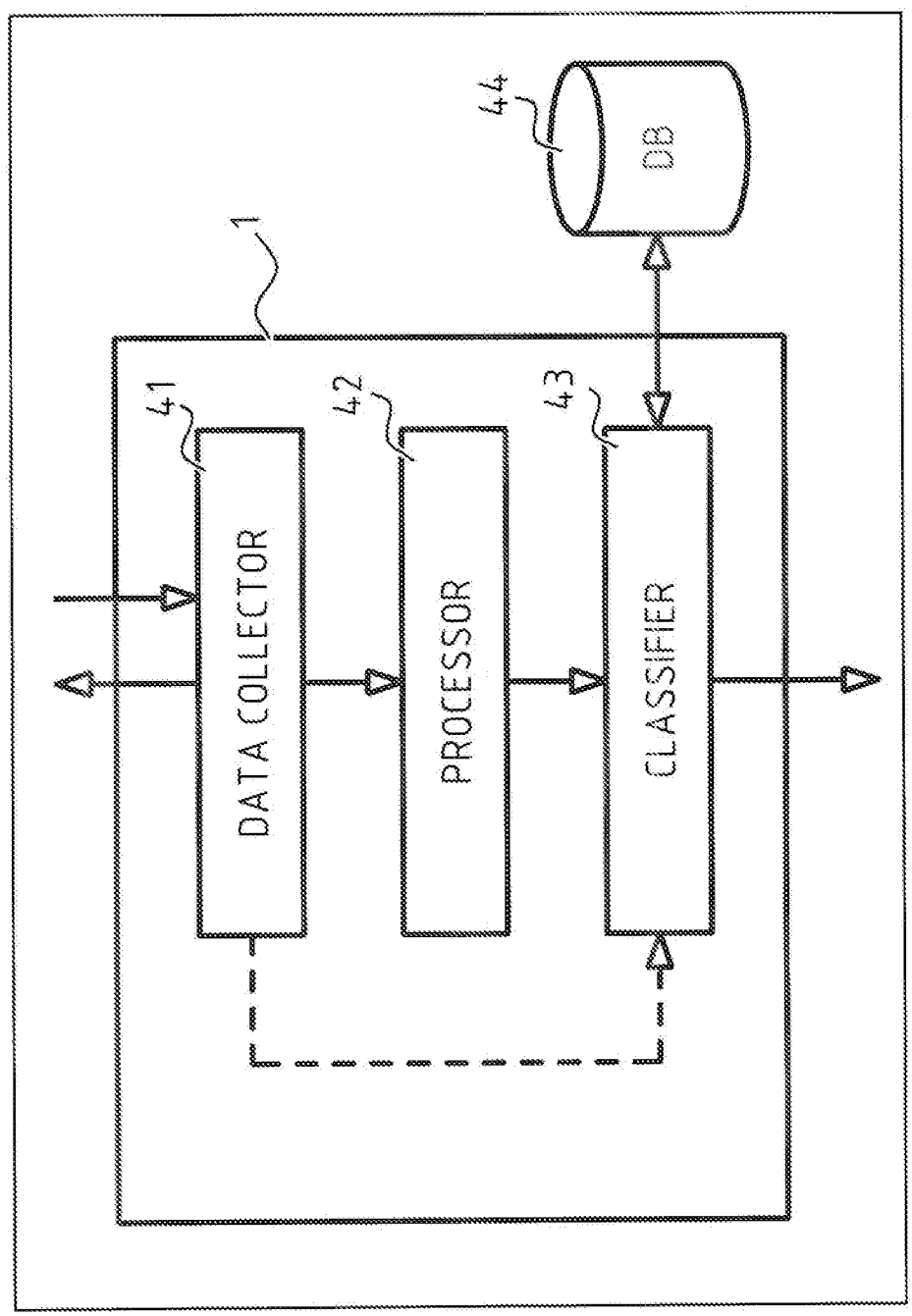
FIG. 4 illustrates schematically an embodiment of a remote server according to the invention.

FIG. 4 illustrates in more detail an embodiment of the remote server 1. The server 1 comprises a data collector 41 adapted for obtaining, through the internet, home network measurement data of at least one home network parameter associated with a capacity of the home network, using an application layer protocol for remote management; a processor 42 adapted to process the received home network measurement data to estimate the capacity of the home network or a parameter related thereto; and a classifier 43 adapted to classify said home network in a user QoS class, based on the estimated capacity or parameter related thereto. The remote server may further be adapted according to any of the embodiments discussed above in relation to the method.

Since most home network devices are TR-069 enabled devices, embodiments of the invention will typically not require any hardware modification at the end user's home network devices. Embodiments of the server of the invention may be implemented within the service operator's management centre and can be used as part of more sophisticated monitoring tools.

Whilst the principles of the invention have been set out above in connection with specific embodiments, it is to be understood that this description is merely made by way of example and not as a limitation of the scope of protection which is determined by the appended claims.

The invention claimed is:

1. Method for determining from a remote server a user quality of service (QoS) class of a home network, performed at the remote server which is connected through the internet with the home network comprising:

obtaining home network measurement data of at least one home network parameter associated with a capacity of the home network, using an application layer protocol for remote management, said capacity being a measure for an amount of traffic that the home network can handle at one time;

processing said home network measurement data to estimate the capacity of the home network or a parameter related thereto;

based on the estimated capacity or parameter related thereto classifying said home network in a user QoS class, wherein said obtaining home network measurement data comprises obtaining at least a first and second CFR vector measured for the home network; said processing said home network measurement data comprises calculating at least one capacity vector as a function of at least said first and second CFR vector, and calculating an average capacity value based on said at least one capacity vector; and said classifying comprises classifying said home network in a user QoS class based on at least said average capacity value.

2. Method of claim 1, wherein said application layer protocol for remote management is the TR-069 protocol.

3. Method of claim 1, wherein said home network is connected to the internet through a home gateway, and said network measurements are obtained through said home gateway.

4. Method of claim 1, wherein said at least one home network parameter comprises at least one of the following, preferably in the form of a frequency dependent vector: channel frequency response (CFR), signal-to-noise ratio (SNR), bit error rate (BER), cyclic redundancy check (CRC), retransmission counter, a noise level.

5. Method of claim 1, wherein said obtaining home network measurement data comprises obtaining at least a series of measurement data representative for noise in the home network; and said classifying is further based on said series of measurement data representative for the noise.

6. Method of claim 1, wherein classifying information is stored in a database, and wherein the classifying of the home network is done based on said classifying information and the estimated capacity or parameter related thereto.

7. Method of claim 6, wherein the estimated capacity or value related thereto is stored in the database as a reference value; and wherein the steps of claim 1 are repeated to obtain a further estimated capacity or parameter related thereto; and wherein this further estimated capacity or parameter related thereto is compared with the reference value.

8. Server adapted for determining a user quality of service (QoS) class of a home network, comprising:
 a data collector adapted for obtaining, through the internet, home network measurement data of at least one home network parameter associated with a capacity of the home network, using an application layer protocol for remote management, said capacity being a measure for an amount of traffic that the home network can handle at one time;
 a processor adapted to process said home network measurement data to estimate the capacity of the home network or a parameter related thereto;
 a classifier adapted to classify said home network in a user QoS class, based on the estimated capacity or parameter related thereto
 wherein said data collector is adapted to obtain at least a first and second CFR vector measured for the home network; said processor is adapted to calculate at least one capacity vector as a function of at least said first and second CFR vector, and to calculate an average capacity value based on said at least one capacity vector; and said classifier is adapted to classify said home network in a user QoS class based on at least said average capacity value.

9. Server of claim 8, wherein said data collector is a TR-069 enabled device.

10. Server of claim 8, wherein said at least one home network parameter comprises at least one of the following, preferably in the form of a frequency dependent vector: channel frequency response (CFR), signal-to-noise ratio (SNR), bit error rate (BER), cyclic redundancy check (CRC), retransmission counter, a noise level.

11. Server of any of the claim 8, wherein said data collector is adapted to obtain at least a series of measurement data representative for noise in the home network; and said classifier is adapted to classify said home network based on said series of measurement data representative for the noise.

12. System comprising a server of any of the claim 8, and a home gateway/said server being connected through the internet to the home gateway/wherein said home gateway is a TR-069 enabled device adapted to receive from said server a request for said network measurement data of at least one home network parameter associated with a capacity of the home network/to obtain measurement data of said at least one home network parameter/and to send said network measurement data to the server.

13. System of claim 12, further comprising a database storing classifying information; wherein said classifier is adapted to classify said home network in a user QoS class based on the classifying information.

* * * * *